US007440650B2

(12) United States Patent
Fondeur et al.

(10) Patent No.: US 7,440,650 B2

(45) Date of Patent: Oct. 21, 2008

(54) PLANAR LIGHTWAVE CIRCUIT BASED WAVELENGTH SELECTIVE SWITCH

(75) Inventors: Barthelemy Fondeur, San Jose, CA (US); Douglas E. Crafts, Los Gatos, CA (US); Eliseo Ranalli, Irvine, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 58 days.

(21) Appl. No.: 11/782,419

(22) Filed: Jul. 24, 2007

(65) Prior Publication Data

US 2008/0031570 A1 Feb. 7, 2008

Related U.S. Application Data

(60) Provisional application No. 60/821,346, filed on Aug. 3, 2006.

(51) Int. Cl.
*G02B 6/26* (2006.01)
*G02B 6/34* (2006.01)
*H04J 14/02* (2006.01)

(52) U.S. Cl. ............................ 385/18; 385/16; 385/37; 398/79; 398/83

(58) Field of Classification Search .................. 385/15, 385/16, 18, 37; 398/79, 83

See application file for complete search history.

(56) References Cited

U.S. PATENT DOCUMENTS

| | | | | |
|---|---|---|---|---|
| 5,002,350 | A | 3/1991 | Dragone et al. | 385/24 |
| 6,097,859 | A | 8/2000 | Solgaard et al. | 385/17 |
| 6,498,872 | B2 | 12/2002 | Bouevitch et al. | 385/24 |
| 6,707,959 | B2 | 3/2004 | Ducellier et al. | 385/17 |
| 6,810,169 | B2 | 10/2004 | Bouevitch et al. | 385/24 |
| 6,922,239 | B2 | 7/2005 | Solgaard et al. | 356/326 |
| 7,014,326 | B2 | 3/2006 | Danagher et al. | 359/615 |
| 7,027,684 | B2 | 4/2006 | Ducellier et al. | 385/24 |
| 2003/0133655 | A1 * | 7/2003 | Dingel | 385/37 |
| 2004/0151432 | A1 * | 8/2004 | Tabuchi et al. | 385/37 |
| 2004/0252938 | A1 | 12/2004 | Ducellier et al. | 385/27 |
| 2006/0067611 | A1 | 3/2006 | Frisken et al. | 385/16 |
| 2007/0041683 | A1 * | 2/2007 | Keyworth | 385/24 |

FOREIGN PATENT DOCUMENTS

| | | |
|---|---|---|
| FR | 2794858 | 12/2000 |
| WO | WO 03/098856 | 11/2003 |

OTHER PUBLICATIONS

"Analysis of Periodically Segmented Waveguide Mode Expanders", Journal of Lightwave Technology, vol. 13, No. 10, Oct. 1995, Weissman et al.

* cited by examiner

*Primary Examiner*—Brian Healy
*Assistant Examiner*—Charlie Peng
(74) *Attorney, Agent, or Firm*—Allen, Dyer, Doppelt, Milbrath & Gilchrist P.A.

(57) ABSTRACT

The present invention extends the concept of a standard array waveguide grating (AWG), which focuses each wavelength component launched via an input AWG to a Rowland circle inside a planar lightwave chip (PLC) where discrete waveguides are located, to one which focuses each wavelength component outside of the PLC chip along a straight line. An array of MEMS mirrors or other redirecting elements is positioned at the focus location for independently redirecting each of the wavelength channels back to any number of selected output AWGs formed on the same PLC chip as the input AWG.

16 Claims, 16 Drawing Sheets

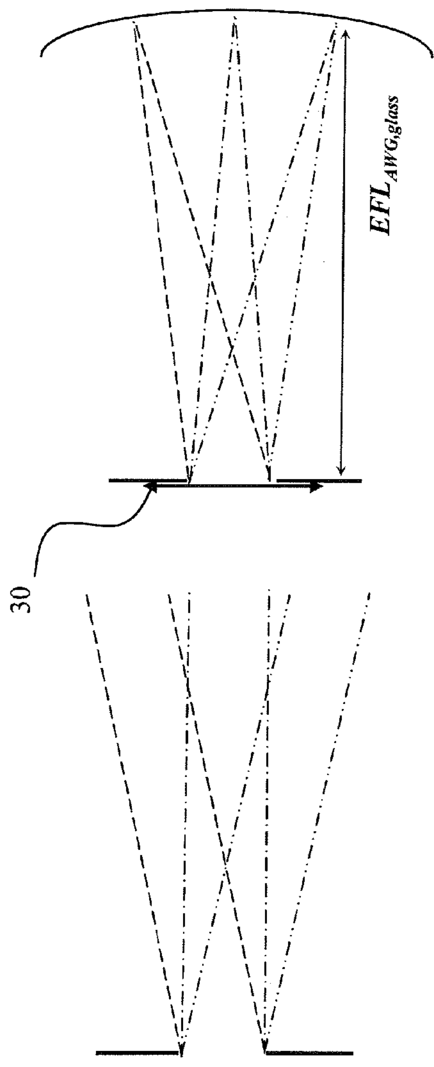
Figure 9a
Figure 9b
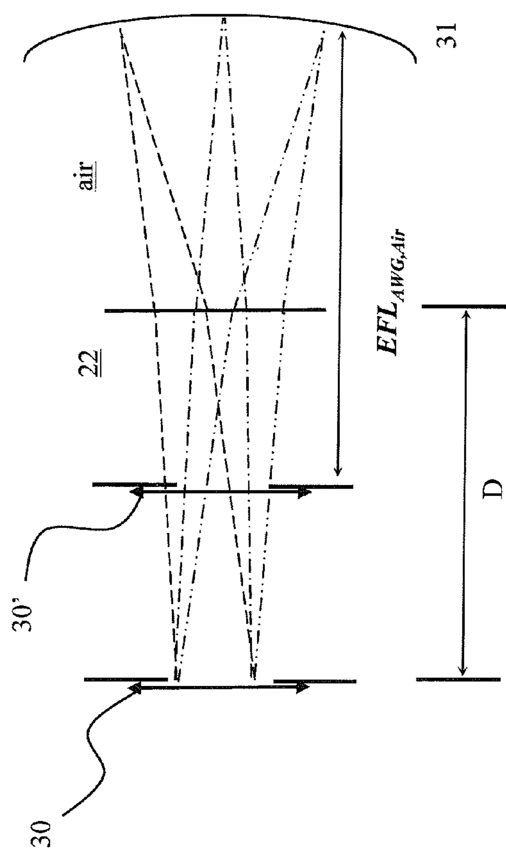
Figure 9c

143
α
141
142

146
145

138
α

PLANAR LIGHTWAVE CIRCUIT BASED WAVELENGTH SELECTIVE SWITCH

CROSS-REFERENCE TO RELATED APPLICATIONS

The present invention claims priority from U.S. Patent Application No. 60/821,346 filed Aug. 3, 2006, which is incorporated herein by reference.

TECHNICAL FIELD

The present invention relates to a wavelength selective switch (WSS), and in particular to a WSS based on planar lightwave circuit (PLC) technology.

BACKGROUND OF THE INVENTION

Conventional optical wavelength dispersive devices, such as those disclosed in U.S. Pat. No. 6,097,859 issued Aug. 1, 2000 to Solgaard et al; U.S. Pat. No. 6,498,872 issued Dec. 24, 2002 to Bouevitch et al; U.S. Pat. No. 6,707,959 issued Mar. 16, 2004 to Ducellier et al; U.S. Pat. No. 6,810,169 issued Oct. 26, 2004 to Bouevitch; U.S. Pat. No. 6,922,239 issued to Solgaard et al; and U.S. Pat. No. 7,014,326 issued Mar. 21, 2006 to Danagher et al, separate a multiplexed optical beam into constituent wavelengths, and then direct individual wavelengths or groups of wavelengths, which may or may not have been modified, back through the device to a desired output port. Typically the back end of the device includes individually controllable devices, such as a micro-electro-mechanical (MEMs) micro-mirror array, which are used to redirect selected wavelengths back to one of several output ports, or an array of liquid crystal cells, which are used to block or attenuate selected wavelengths.

In the case of a wavelength blocker (WB), or a dynamic gain equalizer (DGE) the front end unit can include a single input/output port with a circulator or one input port and one output port. Typically the front end unit will include a polarization diversity unit for separating the input beam into two sub-beams, and ensuring that the two sub-beams have the same state of polarization. The backend unit for a WB or a DGE can be an array of liquid crystal cells, which independently rotate the state of polarization of the wavelength channels to either partially attenuate or completely block selected channels from passing back through the polarization diversity unit in the front end. Examples of WB and DGE backend units are disclosed in U.S. Pat. No. 7,014,326 issued Mar. 21, 2006 to Danagher et al; U.S. Pat. No. 6,498,872 issued Dec. 24, 2002 to Bouevitch et al; and U.S. Pat. No. 6,810,169 issued Oct. 26, 2004 to Bouevitch, which are incorporated herein by reference.

The arrayed waveguide diffraction grating (AWG) was invented by Dragone by combining a dispersive array of waveguides with input and output "star couplers" on a planar lightwave circuit chip. The AWG can work both as a DWDM demultiplexer and as a DWDM multiplexer, as taught by Dragone in U.S. Pat. No. 5,002,350 (March 1991), which is incorporated herein by reference.

In the interests of reliability and robustness to environmental factors, it is desirable to perform as many of the required functions as possible monolithically on a planar lightwave circuit (PLC). However, there is as yet no practical way of including the MEMS array on the PLC. Accordingly, in one way or another, the wavelength channels from all of the ports must be imaged to a MEMS array of mirrors outside of the PLC.

U.S. Pat. No. 7,027,684 issued Apr. 11, 2006 to Ducellier et al, and United States Patent Publication No. 2004/0252938 published Dec. 16, 2004 to Ducellier et al relate to single and multi-layer planar lightwave circuit (PLC) wavelength selective switches (WSS), respectively, which are illustrated in FIGS. 1 and 2. A single level device 1, illustrated in FIG. 1, includes a PLC 2 with an input AWG in the middle, and a plurality of output AWG's on either side of the input AWG. An input optical signal launched into the input AWG is dispersed into constituent wavelengths, which are directed at different angles through lensing 3 to an array of tiltable mirrors 4. The light is collimated in one direction, e.g. vertically, by a first cylindrical lens 5 adjacent to the PLC 2, while a cylindrical switching lens 6 focuses the output light in the horizontal direction onto the tiltable mirrors 4. Each wavelength channels falls onto a different one of the tiltable mirrors 4, which redirect the individual wavelength channels back through the lensing 3 to whichever output AWG is desired for recombination, and output an output port. For the single level device the tiltable mirrors 4 rotate about a single axis to redirect the wavelength channels within the dispersion plane, i.e. the plane of the PLC 2.

A two level device 11, illustrated in FIG. 2, includes a second PLC 12, similar to the PLC 2, superposed above the PLC 2 with a plurality of input or output AWG's and ports. A second cylindrical lens 15 is superposed above the first cylindrical lens 5 for focusing the beams of light onto the output AWG's provided on the second PLC 12. For the two-level device, tiltable mirrors 14 rotate about two perpendicular axes to redirect the wavelength channels within the dispersion plane (as above) and at an acute angle to the dispersion plane into a plane parallel to the dispersion plane, i.e. the plane of the PLC 12.

In the aforementioned Ducellier devices, the AWG's terminate in straight linear arrays at the edge of the chip, whereby without the curvature at the AWG outputs, the "foci" occur at infinity. Accordingly, an external, bulk-optic lens is required to function as more than simply a field lens, but as a full (spatially) Fourier transforming lens. Consequently, not only is the external lens required to be extremely well aligned, i.e. relatively expensive and extremely sensitive to misalignments, but the optical path is necessarily mostly in air.

An object of the present invention is to overcome the shortcomings of the prior art by providing virtual pupils at the interface between the channel waveguides and the slab waveguide for focusing each wavelength channel at a point outside of the chip.

SUMMARY OF THE INVENTION

Accordingly, the present invention relates to a wavelength dispersive device comprising:

a first planar lightwave circuit (PLC) chip comprising: an input port for launching an input optical signal including a plurality of wavelength channels; an input arrayed waveguide grating (AWG) for dispersing the plurality of wavelength channels including: an input slab waveguide region optically coupled to the input port, a first array of channel waveguides, extending from the input slab waveguide region, and an input/output slab waveguide region for guiding the dispersed wavelength channels between the first array of channel waveguides and a first edge of the first PLC chip, wherein an interface between the first array of channel waveguides and the input/output slab waveguide region is curved providing optical power, which focuses the wavelength channels along a curved focal plane outside of the PLC chip; a first plurality of output AWG's for combining selected wavelength channels into output optical signals, each output AWG including: the input/output slab waveguide region for guiding the dispersed wavelength channels between the first array of channel waveguides and an edge of the first PLC chip; a second array of channel waveguides extending from the input/output slab waveguide region, and a first plurality of output slab waveguide regions for guiding the output optical signals between the second array of channel waveguides to a second edge of the PLC chip, wherein an interface between the second array of channel waveguides and the input/output slab waveguide region is curved providing optical power; and a first plurality of output ports for outputting the output optical signals;

a first array of switching elements for independently redirecting each of the wavelength channels from the first input optical signal to selected first output arrayed waveguide gratings forming the first output optical signals for output respective first output ports; and a field lens between the first edge of the PLC chip and the first array of switching elements for changing the focal plane of the wavelength channels from the curved line to along a straight line defining the first array of switching elements.

BRIEF DESCRIPTION OF THE DRAWINGS

The invention will be described in greater detail with reference to the accompanying drawings which represent preferred embodiments thereof, wherein:

FIG. 9*a* illustrates the dispersal of an input optical signal from channel waveguides of an AWG into a slab waveguide region;

FIG. 9*b* illustrate the effect of making the interface between channel waveguides of an AWG and an output slab region curved;

FIG. 9*c* illustrates the refraction through the edge of a PLC chip into an unguided region, which effectively places a virtual pupil of the same size as the AWG pupil at some smaller distance from the edge of PLC chip;

DETAILED DESCRIPTION

Figure 1:
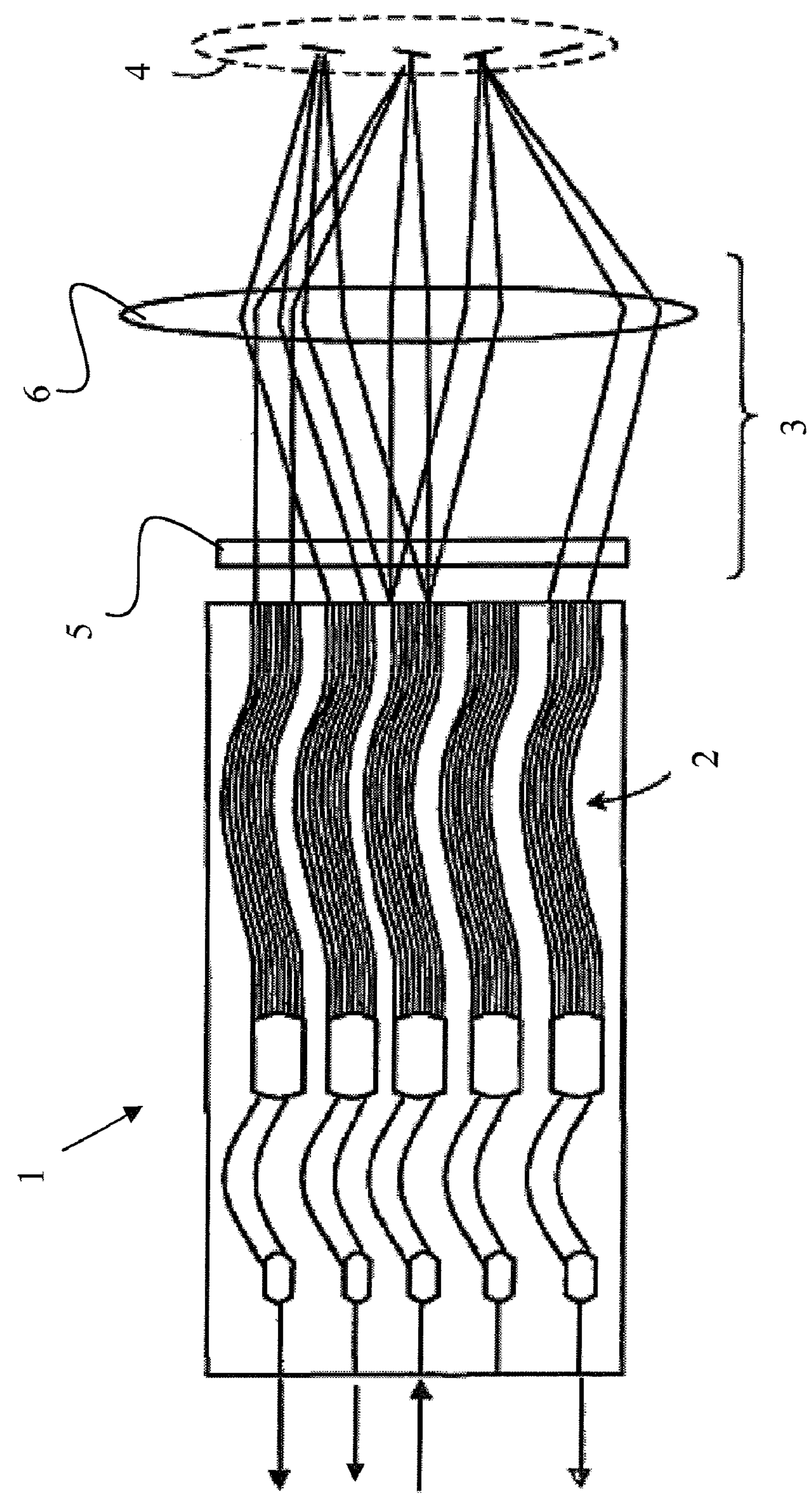
FIG. 1 is a plan view of a conventional PLC WSS.
Figure 2:
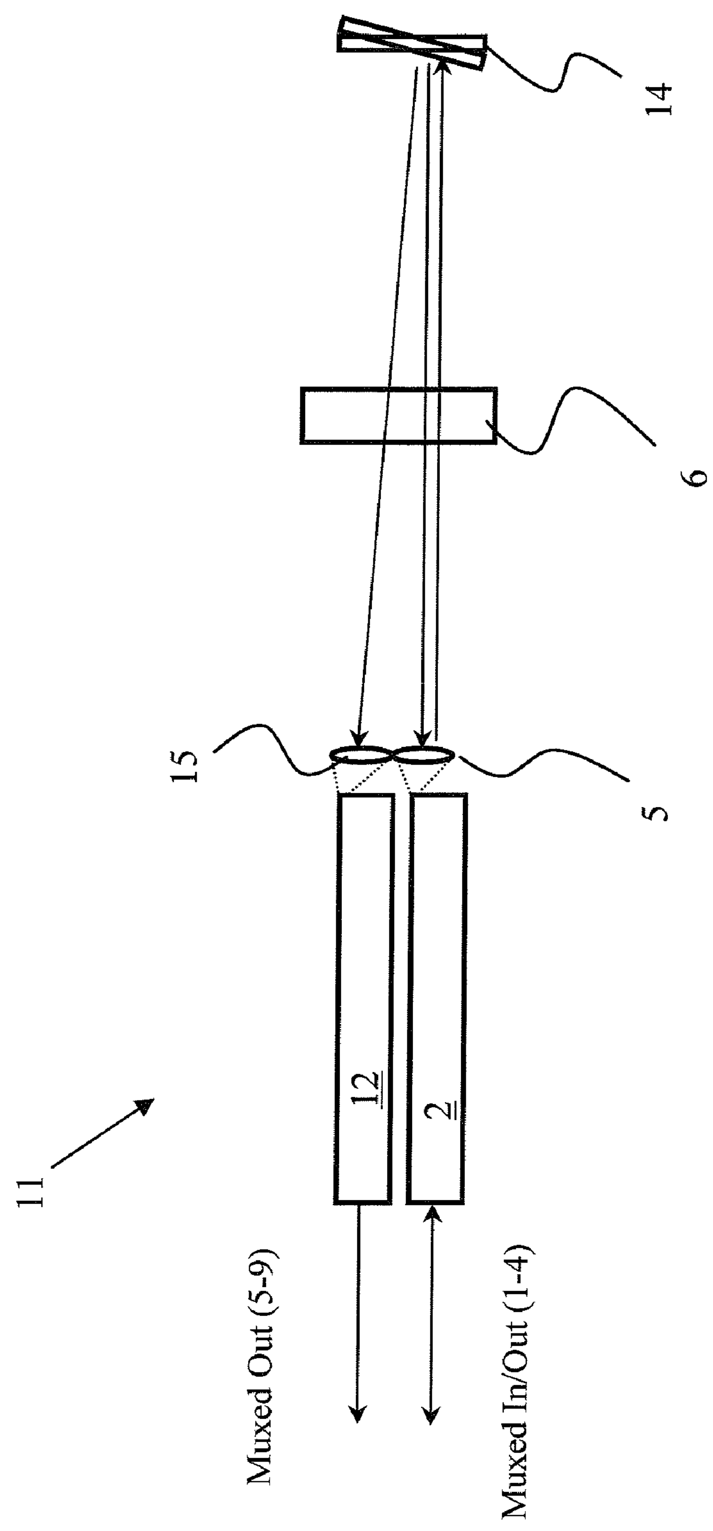
FIG. 2 is a side view of a conventional multi-layer PLC WSS.
Figure 3:
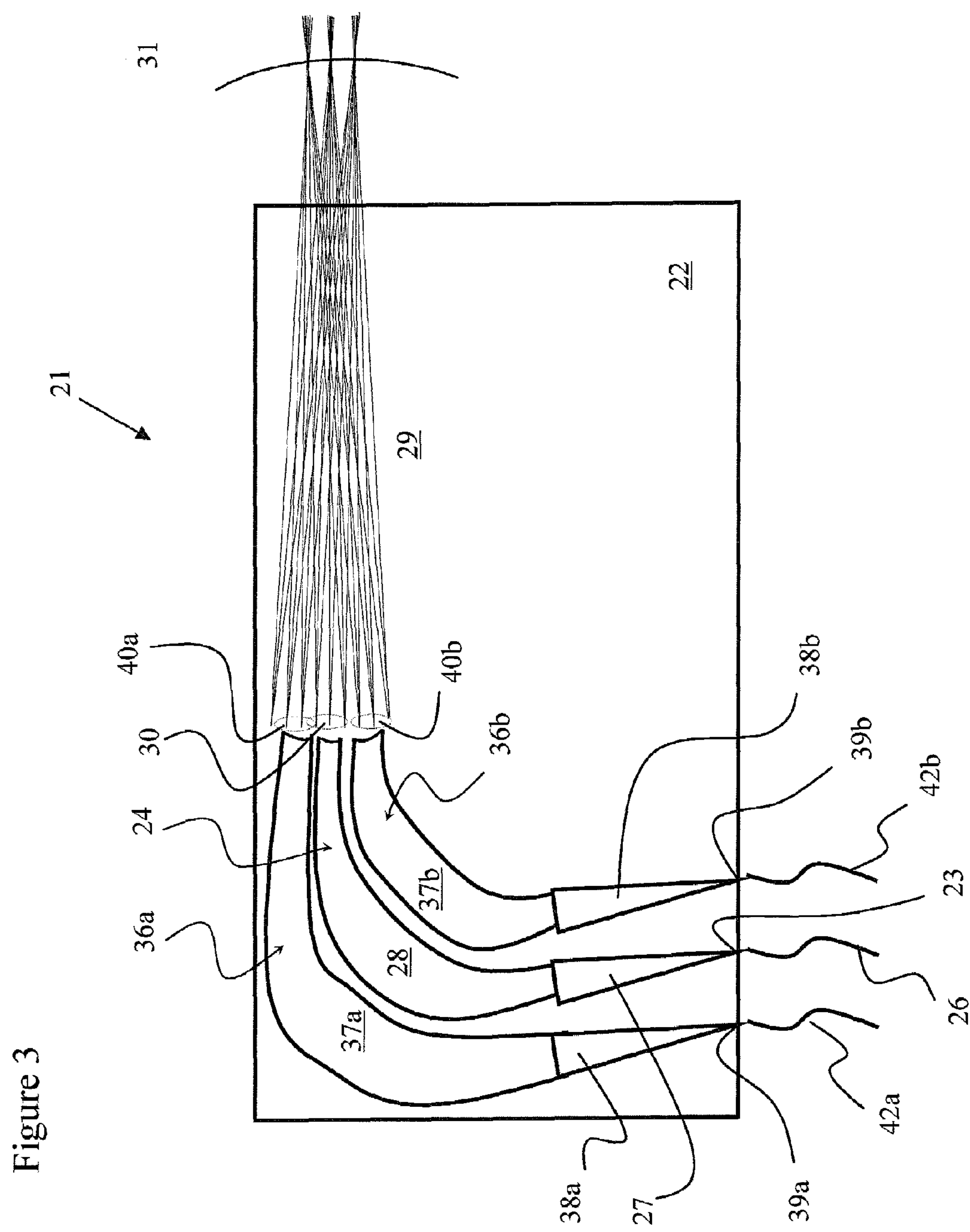
FIG. 3 is a plan view of a PLC chip in accordance with the present invention without corrective optics.

The present invention extends the concept of a standard array waveguide grating (AWG), which focuses each wavelength component to a Rowland circle inside the chip where discrete waveguides are located, to one which focuses each wavelength component outside of the chip, and then place a MEMS mirror array at the focus location. With reference to FIG. 3, a basic device 21 according to the present invention includes a PLC chip 22 with an input port 23 at an edge thereof enabling a first AWG 24 to be optically coupled to an input fiber 26. An input optical signal, including one or more wavelength channels, is launched from the input fiber 26 into the AWG 24 via the input port 23, and diffracts, in one dimension, within entrance slab waveguide section 27 to an array of channel waveguides 28. The outputs of the channel waveguides 28 interface with a long output slab waveguide region 29 along an interface, which is curved forming a virtual sub-pupil 30 with optical power, whereby the wavelength channels refract out of the PLC chip 22 in a dispersion plane parallel to or coincident with the first AWG 24, and focus at various points, which trace out a circle, generally indicated by 31, in order of increasing wavelength.

Figure 4:
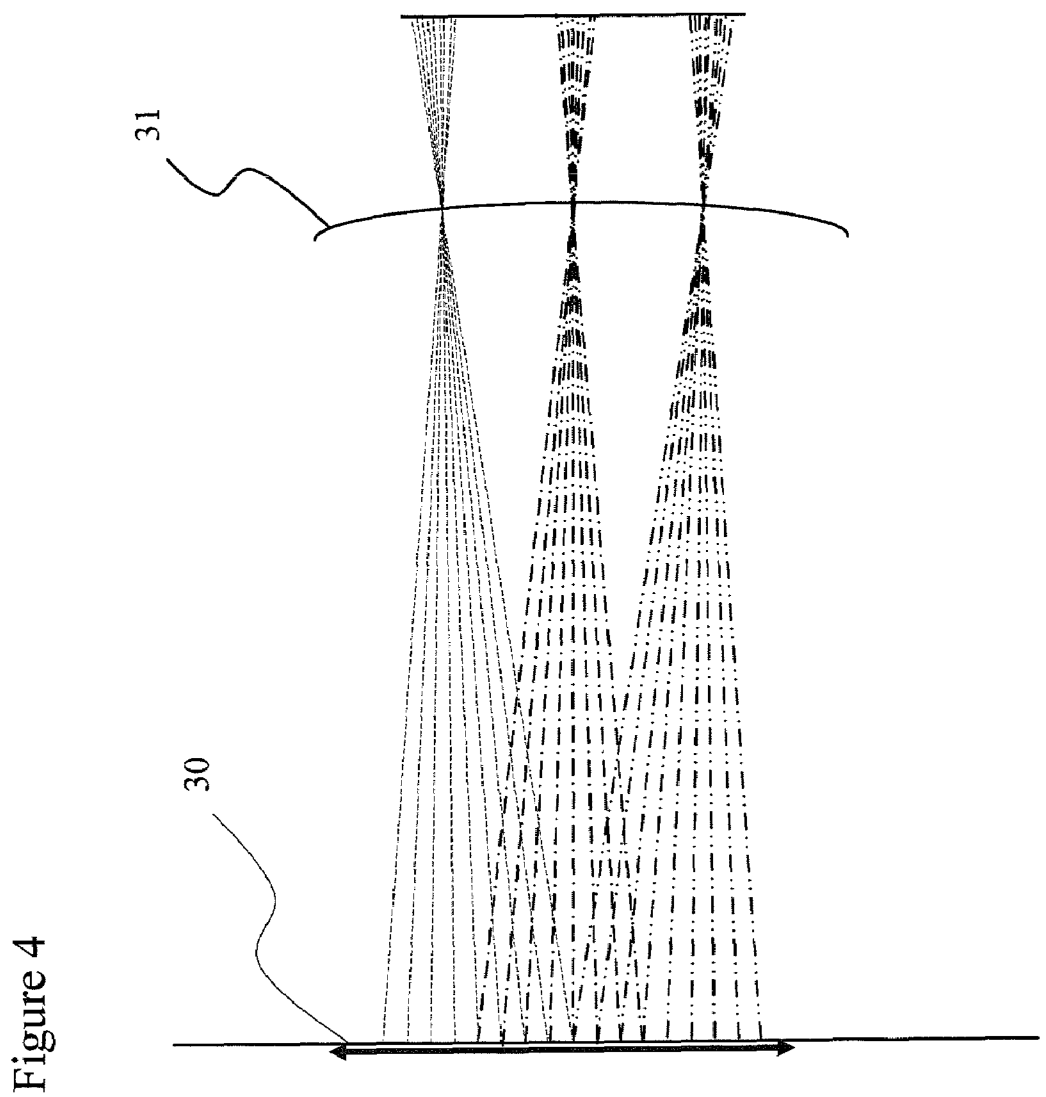
FIG. 4 is a ray diagram of the PLC of FIG. 3.

With reference to FIG. 4, the upper rays (dashed lines) represent the rays emitted from the ends of the array of channel waveguides 28, i.e. virtual pupil 30, at an extreme wavelength, e.g. at the short wavelength end of the intended spectral band of interest, while the middle rays (dashed, one dot) represent the center wavelength trajectories, and the lower rays (dashed, two dots) represent the extreme wavelength, opposite to those represented by the upper rays. It should be noted that the aforementioned imaging applies to an exemplary dispersion direction and plane of the AWG 24; however, considerations for imaging the light diffracting out of the PLC chip 22 in a direction or a plane perpendicular to the PLC chip 22, i.e. out of the plane of FIG. 3, will be presented hereinafter.

Optically, the curved interface between the channel waveguides 28, 37a and 37b and the output slab waveguide region 29 has optical power, i.e. can be thought of as a virtual pupil, e.g. a curved lens with optical power, which tilts with increasing wavelength. The virtual pupil refers to the array of waveguides arriving to the slab waveguide region, whereby the light emitted from them generates a field that "tilts only with wavelength", i.e. it is identical for each wavelength except for its direction, which depends of the dispersion of the AWG, i.e. the constant delay between the waveguides. To ensure this behavior for small tilts, adjacent waveguides within the array of waveguide channels 28 of the input AWG 24 have a constant delay between them. The ends of the channel waveguides 28, 37*a* and 37*b* thus represents sub-pupils or sub-lenses 30, 40*a* and 40*b*, respectively, illustrated in phantom outline in FIG. 3. The pupil can be partitioned in such a way that the spectral resolution can be chosen, i.e. the more waveguides in a given sub-pupil, the finer the spectral resolution. For example, rather than three ports, five ports can be located on the PLC chip 22, with a spectral resolution of 3/5 that of the PLC chip 22 suggested in FIG. 3.

The sub-pupil 30 disperses the rays of each wavelength channel, such that any beam emanating from sub-pupil 30 at a given wavelength will do so at a unique angle. The effect of making the interface between the AWG 24 and the output slab region 29 (or 69) curved is to effectively place a lens at the output of the input AWG 24, whereby the bundle of rays of each wavelength channel will focus at a spot.

Ideally, an array of modifying or redirecting elements, e.g. an array of tilting MEMs mirrors 35, should be placed at the focal points, i.e. one at each wavelength channel location, for independently redirecting each wavelength channel back through the output slab waveguide region 29 to a desired or selected one of a plurality of output AWGs 36*a* and 36*b* or back to the input AWG 24. Accordingly, a bundle of rays representing one or more of the wavelength channels coming from the sub-pupil 30 is reflected toward one of the sub-pupils 40*a* or 40*b* for recombining and output the desired output port 39*a* or 39*b*. Each output AWG 36*a* and 36*b* includes an array of channel waveguides 37*a* and 37*b*, respectively, and a exit slab waveguide section 38*a* and 38*b*, respectively. Output ports 39*a* and 39*b* enable the exit slab waveguide sections 38*a* and 38*b* to be optically coupled to output fibers 42*a* and 42*b*, respectively.

Furthermore, the array of MEMs mirrors 35 can be replaced by other optical switching elements, e.g. liquid crystal on silicon (LCoS) phased arrays, such as those disclosed in United States Patent Publication No. 2006/0067611 published Mar. 30, 2006 to Frisken et al, which is incorporated herein by reference, or an array of polarization rotators, e.g. liquid crystal cells, for independently rotating the polarization of individual wavelength channels, whereby a portion, or the entire wavelength channel, can be blocked or switched.

The illustrated embodiment includes one input and two output waveguides and ports; however, additional input and output waveguides and ports are within the scope of this invention. Moreover, for the sake of simplicity, the ports and AWGs have been identified as "input" and "output"; however, all of the ports and waveguides are suitable for both incoming and/or outgoing signals, depending on the particular application.

Unfortunately, the embodiment illustrated in FIGS. 3 and 4 has shortcomings, which cause difficulties in manufacture and/or imaging. First, the ray bundles for each wavelength channel do not fall on a straight line, but on a refracted image 31 of the Rowland circle, as illustrated in FIG. 4. As such, not only would the MEMs mirror array 35 not lie on a straight line, but the range of angles required to connect the input port with the output ports becomes wavelength-dependent, thus requiring an increased range of tilt angle for the MEMs mirrors compared to a telecentric system, wherein all cones, representing the collection of rays at a given wavelength from the input AWG 24 come to a focus in parallel, i.e. in which the corresponding Rowland circle has an infinite radius.

Figure 5:
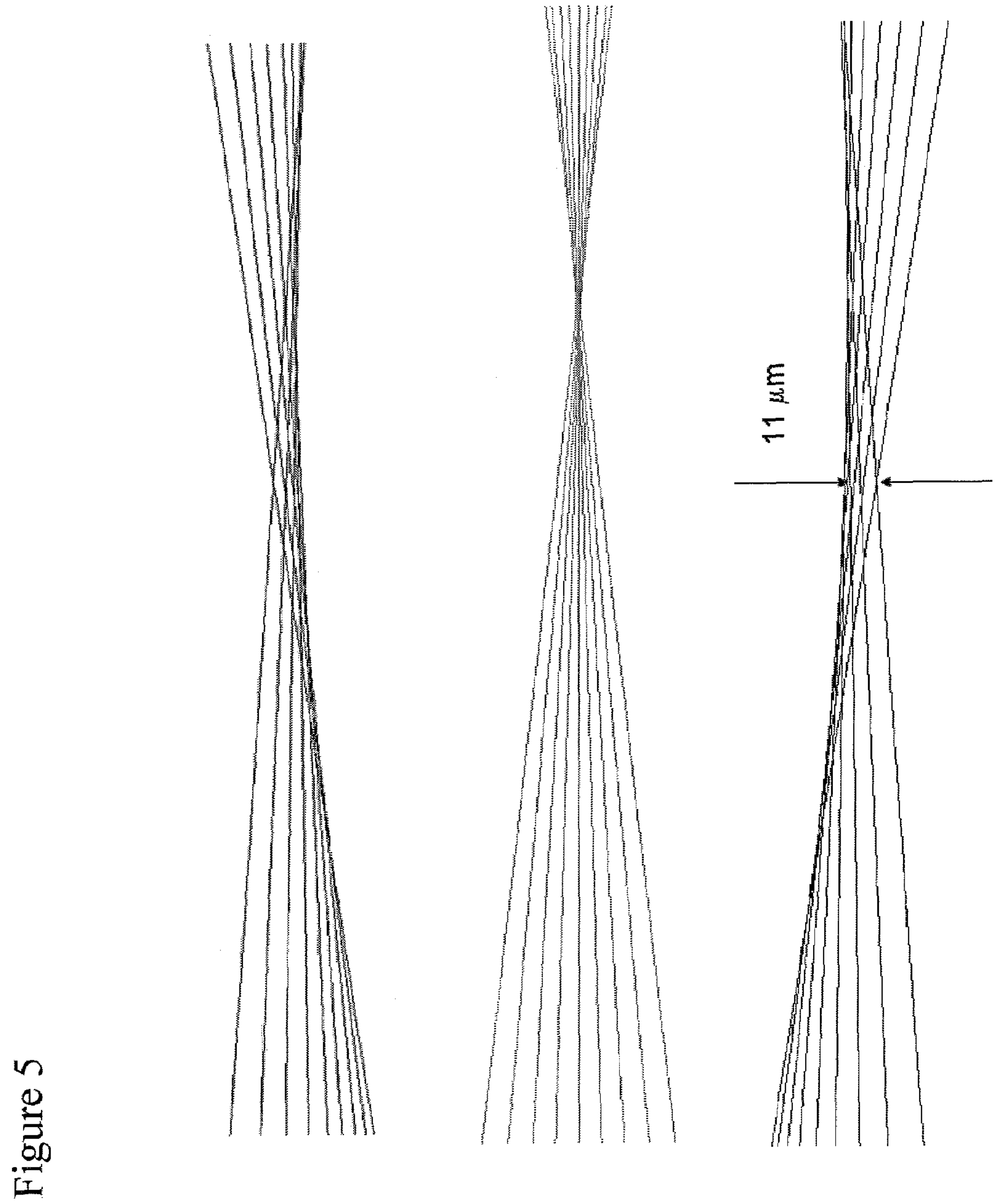
FIG. 5 illustrates the spherical aberration introduced by focusing the fields through a waveguide/air interface.

Second, a close-up of the foci (FIG. 5) illustrates that the spherical aberration introduced by focusing the fields through a waveguide/air interface are significant. Although the details of this particular design are not relevant to the invention, it should be noted for reference that the "circle of least confusion" for this particular collection of rays has a diameter of 11 microns.

To operate better as a WSS in accordance with the present invention, the circle 31 representing the locus of fields focusing from the chip must be straightened to a line corresponding to an array of wavelength channel redirecting means, e.g. MEMS mirrors, via some form of optics, e.g. a field lens. In addition to straightening the locus of focusing fields, the field lens also reduces the spherical aberration coming from the chip/air interface.

Figure 6:
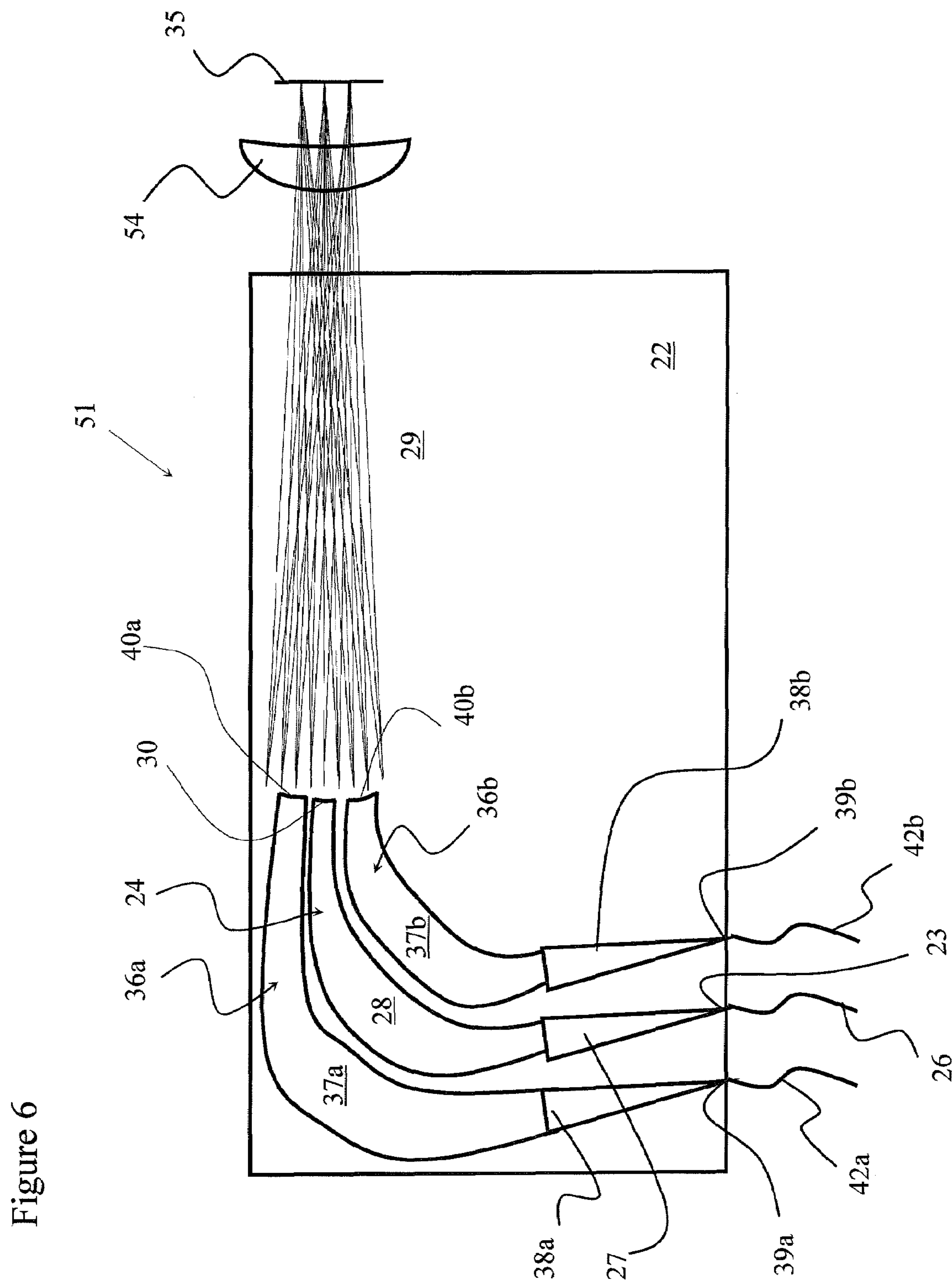
FIG. 6 is a plan view of a PLC WSS according to the present invention.

To solve the aforementioned problems, an external field lens 54, as illustrated in FIG. 6, is added to a WSS 51 between the edge of the PLC chip 22 and the modifying or redirecting elements 35. The remaining elements of the WSS 51 are substantially identical to those of WSS 21 of FIG. 3. As a result, the (now telecentric) cones have been straightened, thus minimizing the required mirror tilt range for a given target width of the array of MEMS mirrors 35. Furthermore, the field lens 54 is selected and designed such that the spherical aberration coming from the field lens 54 is everywhere opposite in sign from that coming from the interface between the PLC chip 22 and the air. To further improve optical coupling, the interface between channel waveguides 28, 37*a* and 37*b* and the output slab waveguide region 29 is modified from the usual circular shape, to a more general conical shape. To maintain the condition that the virtual pupil simply rotate with wavelength, but otherwise keep its same shape, all adjacent channel waveguides have a constant delay. This constraint is then reckoned in the design layout of the individual channel waveguides comprising each port's AWG.

Figure 7:
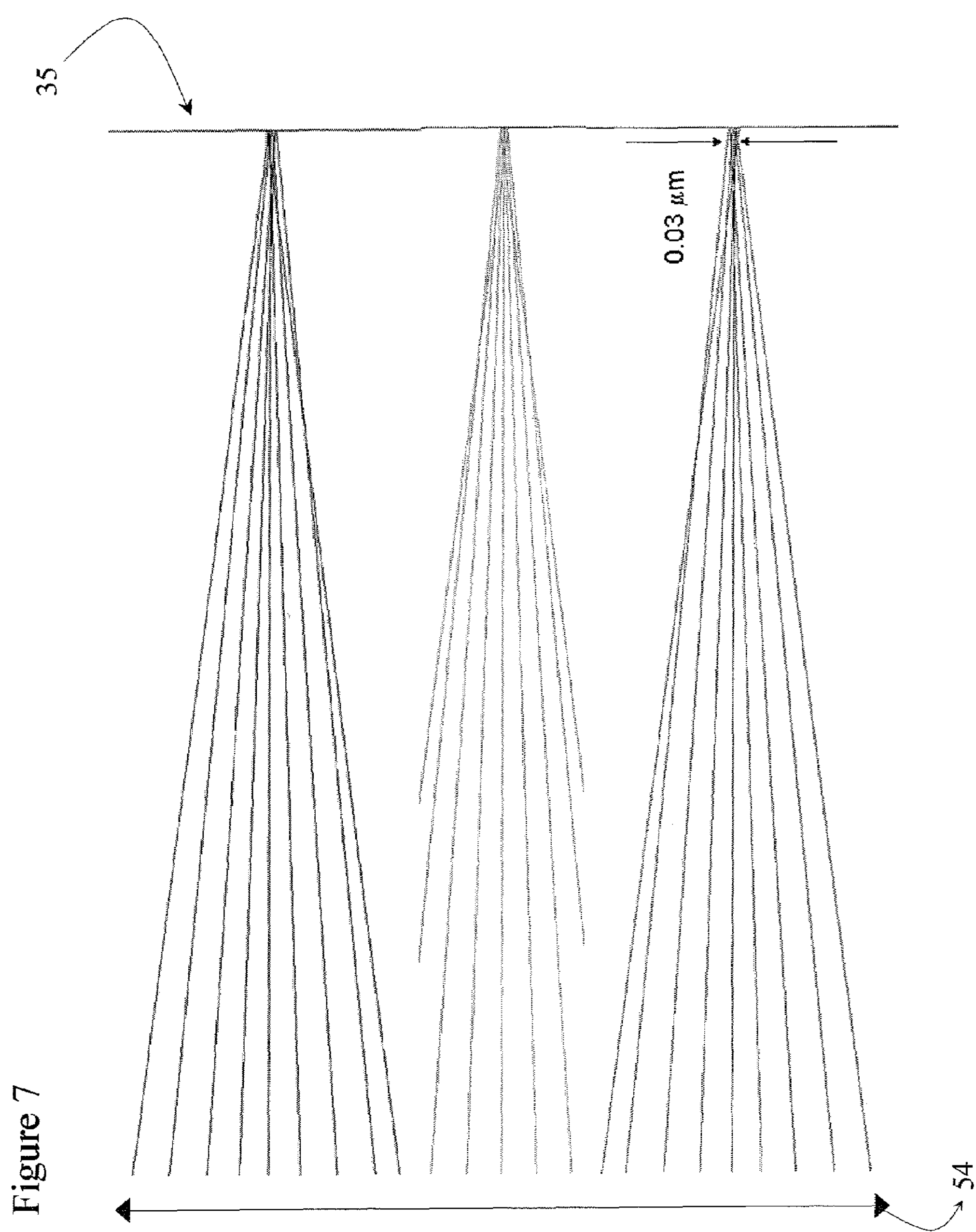
FIG. 7 is a ray diagram of the PLC WSS of FIG. 6.

The net result of the combination of optimizing the channel/slab interface and the introduction of a simple cylindrical field lens 54 is a substantial reduction of the aberrations seen by the focused spots. As shown in FIG. 7, the circle of least confusion in the foci at the extreme wavelengths is reduced by a factor of more than 350 for this particular design, i.e. to about 30 nm. The combination of the cylindrical field lens 54, tailoring the interface between the channel waveguides 28 and the output slab waveguide region 29, and laying out the channel waveguides 28, such that the delay between adjacent waveguides is constant, enables the structure of the input AWG 24 to focus the individual wavelengths to telecentric, diffraction-limited fields at a flat plane including the MEMs array 35. Furthermore, the architecture is such that the light stays in the PLC chip 22 most of the time, enabling a robustness almost on a par with a completely monolithic (everything-on-a-chip) solution.

Figure 8:
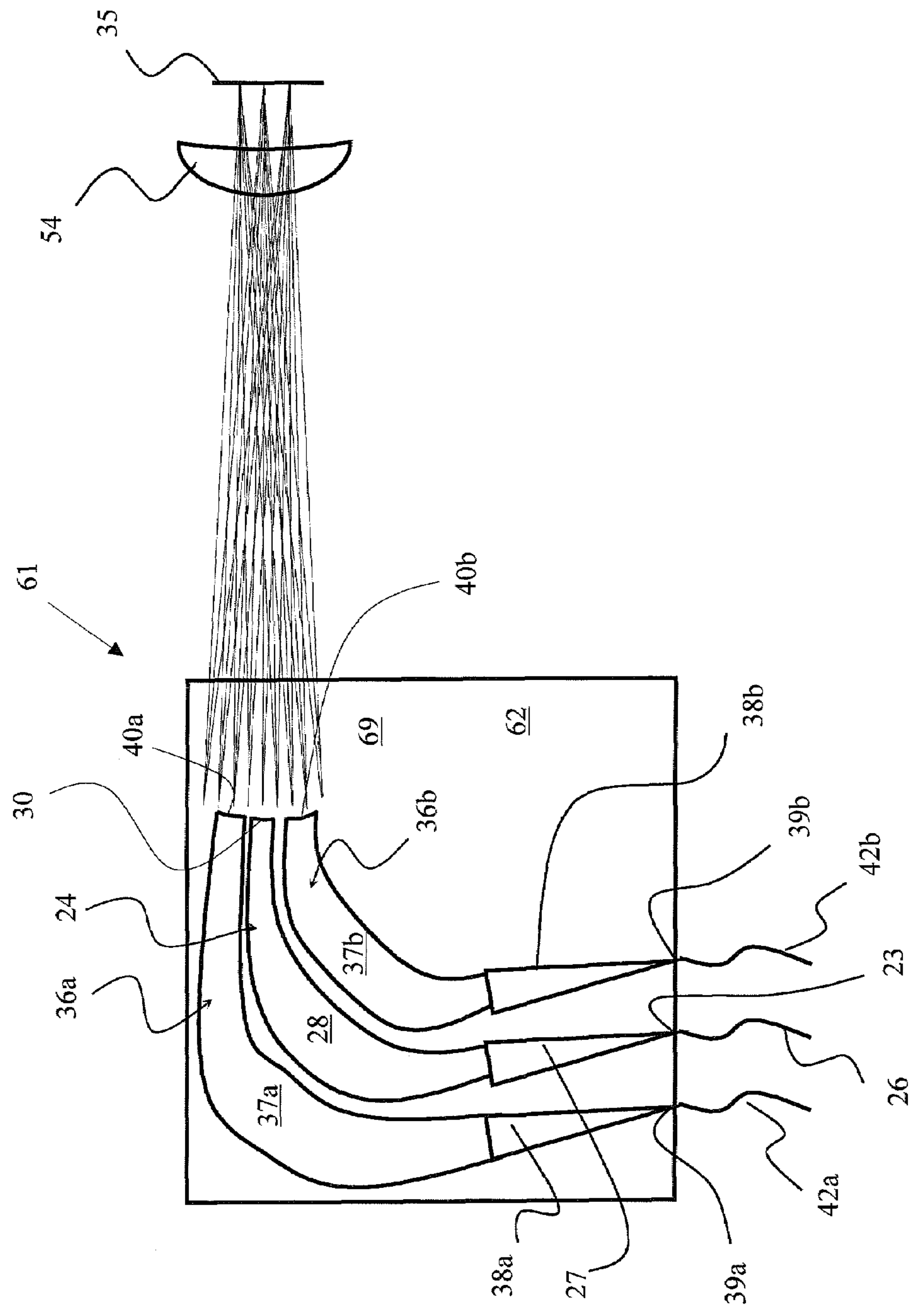
FIG. 8 is a plan view of another embodiment of a PLC WSS according to the present invention.

Unfortunately, the rather large area associate with the output slab region 29 significantly adds to the cost of the PLC chip 22. One way to minimize the cost is to provide a reduced output slab waveguide region 69 on a reduced PLC chip 62, i.e. add to the unguided region between the PLC chip 62 and the field lens 54, as illustrated on WSS 61 in FIG. 8. The quality of the foci are expected to be inferior to those associate with longer output slab regions, but this represents the compromise with reduced chip cost. The remaining elements in the embodiment of FIG. 8 are identical to those of FIGS. 3 and 6.

The ends of the channel waveguides 28 from the input AWG 24, i.e. sub-pupil 30, disperses the input optical signal, such that any beam emanating from that pupil at a given wavelength will do so at a unique angle, as suggested in FIG. 9*a*. The effect of making the interface between the AWG 24 and the output slab region 29 (or 69) curved is to effectively place a lens at the output of the input AWG 24, as suggested in FIG. 9*b*. Assuming the MEMs array 35 is positioned at the edge of the PLC chip 22, the wavelength-dispersed fields come to a focus at a distance corresponding to the effective focal length (EFL) in glass, i.e. the material in the PLC 22, equal to the (Rowland circle 31) radius of curvature, as in FIG. 9*b*. However, the aforementioned assumption is not entirely correct, as the fields refract through a second interface between an edge of the PLC chip 22 and the unguided region (air). The refraction through the edge of the PLC chip 22 into the unguided region effectively places a virtual pupil 30 of the same size as the real AWG pupil 30 at some smaller distance from the edge of PLC chip 22, as illustrated in FIG. 9*c*. If the sub-pupil 30 is located a distance D from the edge of the PLC chip 22, the virtual pupil is found at a distance D/n from the chip edge, where n is the effective slab index for the output slab waveguide section 29 or the PLC chip 22. The virtual pupil/lens 30' behaves as if the AWG 24 was constructed in air, and the effective focal length $EFL_{AWG,Air}$ is smaller than the Rowland circle radius by a factor of 1/n.

Figure 10:
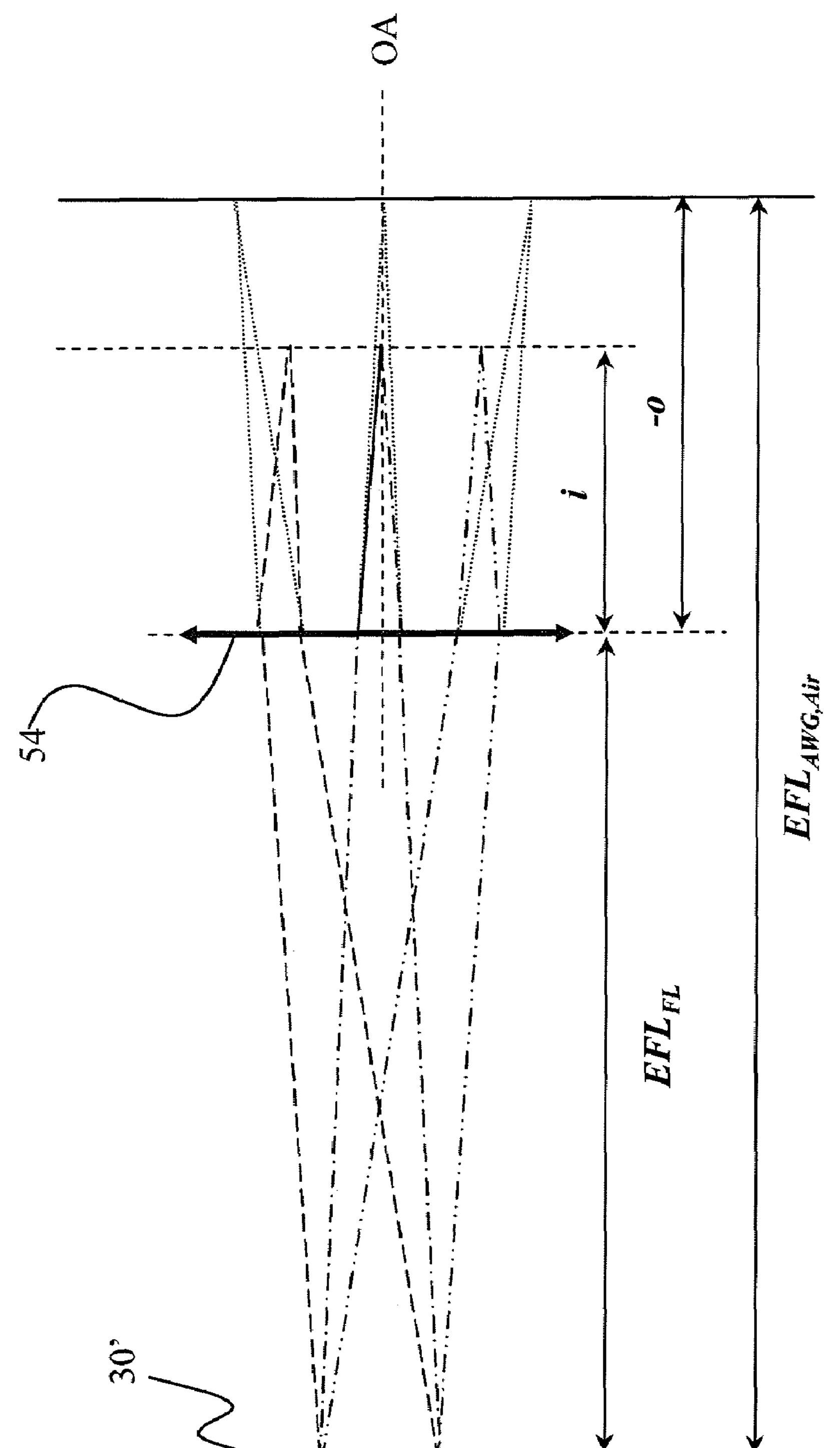
FIG. 10 illustrates a full paraxial model, according to the present invention, in which a virtual pupil focuses the rays of the wavelength channels to a plane $EFL_{AWG,Air}$ away.
Figure 11B:
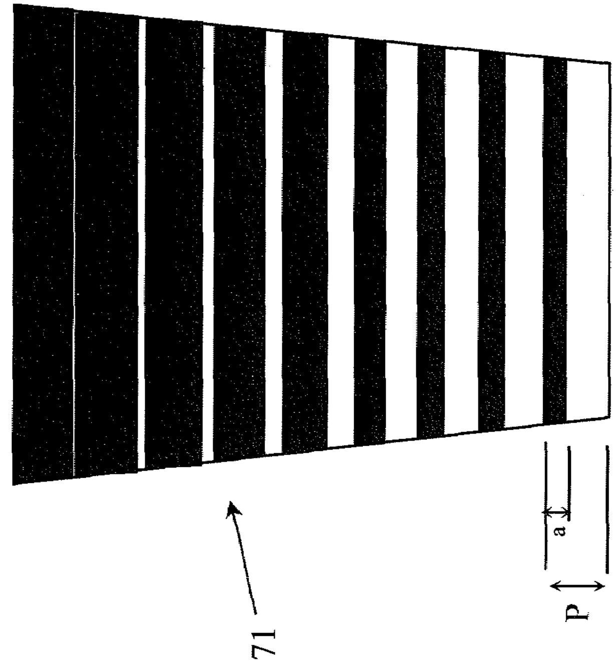
FIGS. 11*a* and 11*b* illustrate plan views of periodically segmented slab segments in slab waveguide regions of the PLC WSS of FIG. 8.
Figure 11A:
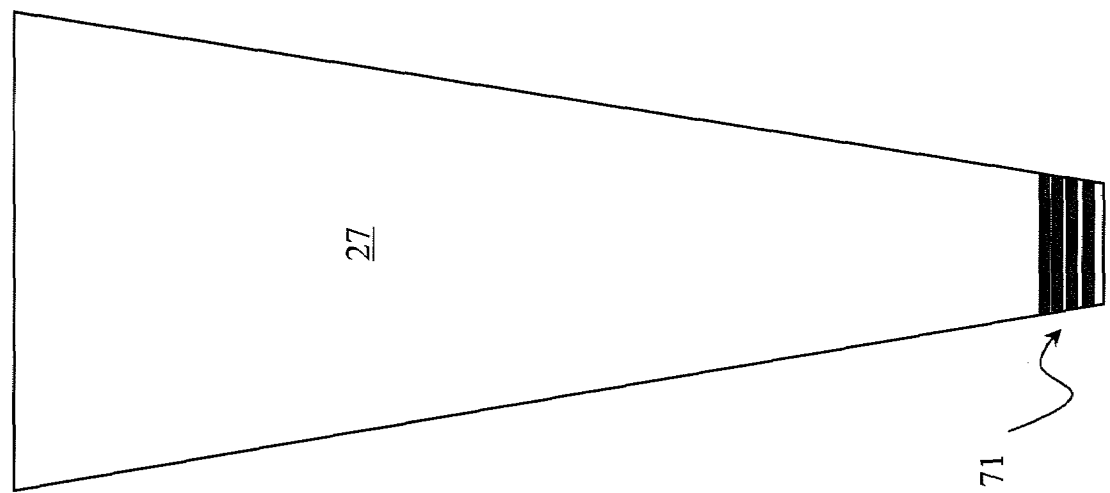

FIG. 10 illustrates a full paraxial model, according to the present invention, in which the virtual pupil 30' focuses the rays of the wavelength channels to a plane $EFL_{AWG,Air}$ away. All that is required for the foci at all wavelengths to be parallel to the optical axis OA of the field lens 54 is that the virtual pupil 30' appear in the front focal plane of the field lens 54, i.e. one $EFL_{FL}$ away, and that $EFL_{FL}<EFL_{AWG,Air}$. The difference between these two EFLs is indicated as −o, in deference to the first-order imaging condition with respect to the field lens: $1/o+1/i=1/EFL_{FL}$. Simplifying the result, $i=(EFL_{FL}/EFL_{AWG,Air})(EFL_{AWG,Air}-EFL_{FL})$, with a consequential magnification in the foci of $M=-i/o=EFL_{FL}/EFL_{AWG,Air}$.

Additional structures can be placed on the PLC chip 22 to further improve the optical performance and sensitivity of the combined optical module 51 (or 61). The additional structures improve the optical coupling loss between the fibers 26, 42*a* and 42*b* and the optical module 51 (or 61) according to the present invention, and also reduce the numerical aperture of the light in the non-dispersive direction, reducing the requirements and improving the performance of the free-space optical block of the optical module 51.

In order to reduce the size of PLC chip 22 (or 62), a larger index contrast, i.e. the difference between the refractive index of the core and cladding of the PLC chip 22, is selected to enable a smaller bend radius in the channel waveguides 28, 37*a* and 37*b*. However, the index contrast difference results in undesired coupling loss when trying to match the mode of the fibers 26, 42*a* and 42*b* to the channel waveguides 28, 37*a* and 37*b*.

"*Analysis of Periodically Segmented Waveguide Mode Expanders*", Journal of Lightwave Technology, vol. 13, no. 10, Oct. 1995, Z. Weissman and I. Hendel, which is incorporated herein by reference, discloses two-dimensional tapered structures enabling a reduction of the mode mismatch between the fiber and the waveguide.

In the preferred embodiment of the present invention, light is directly launched into the entrance slab waveguide section 27 of the AWG 24. To improve the coupling of the fiber 26 and the entrance slab waveguide section 27, periodically segmented slab segments (PSS) 71 are provided at the interface between the fiber 26 and the entrance slab waveguide section 27, i.e. proximate input port 23. The PSS 71 have a substantially uniform period, in which the duty cycle, which represents the ratio of the width (a) of the waveguide segment to the period (P), reduces from 1, on the side of the array of channel waveguides 28, to an exit ratio between 0 and 1 (0.1 to 0.9, preferably 0.25 to 0.75) proximate the input port 23. The exit ratio depends of the difference of the index contrast between the PLC chip 22 and the fiber 26.

For example: in the case of coupling a 0.3%-delta fiber to a 0.7%-delta waveguide, the exit ratio was found to be optimal for values close to 0.7. The exit ratio will be naturally close to 1 if the index difference between the fiber 26 and the PLC chip 22 is small, and small if the difference is great.

Figure 12:
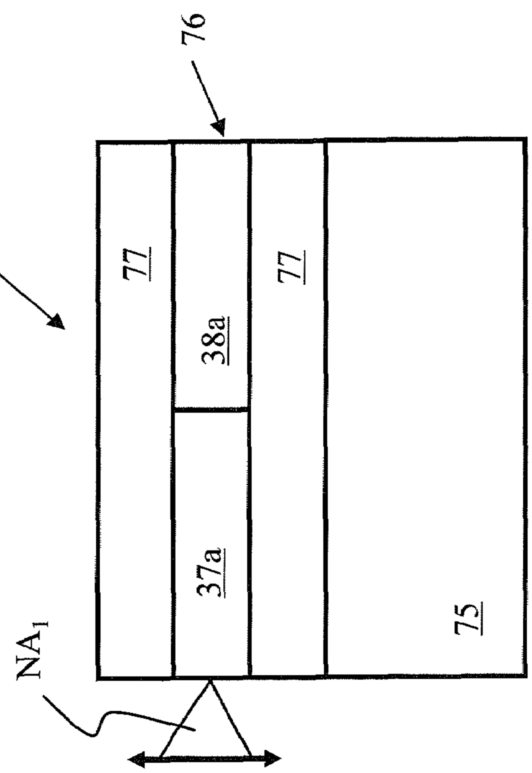
FIG. 12 is a side view of slab waveguide regions of the PLC WSS of FIG. 8

With reference to FIG. 12, a cross section of the PLC 22 (or 62) includes a substrate 75 supporting a core region 76 sandwiched between cladding layers 77. The core region 76 defines the exit slab waveguide sections, e.g. 38*a*, and the channel waveguides, e.g. 37*a*. The light exiting the exit slab waveguide section 38*a* will have a certain numerical aperture (NA), which depends of the index contrast of the PLC chip 22, i.e. the difference between the refractive index of the core 76 and the cladding 77.

$$NA=\sqrt{\sqrt{n_{core}^2-n_{cladding}^2}}$$

In order to reduce the size of the PLC chip 22, the index contrast of the PLC chip 22 is chosen larger than the index contrast of the fibers 42*a* and 42*b* to enable a smaller bend radius in the channel waveguides 37*a* and 37*b*. However, a larger index contrast results in a larger NA, which can have negative impact on the optical performance, e.g. more optical aberrations, and stability of the free-space propagation part of the module 51 (or 61), e.g. more sensitivity to tilts or displacements of the package. One solution to compensate for the large NA, is to use more complex free-space optical elements or packages, which adds to the cost and complexity of the module.

Figure 13:
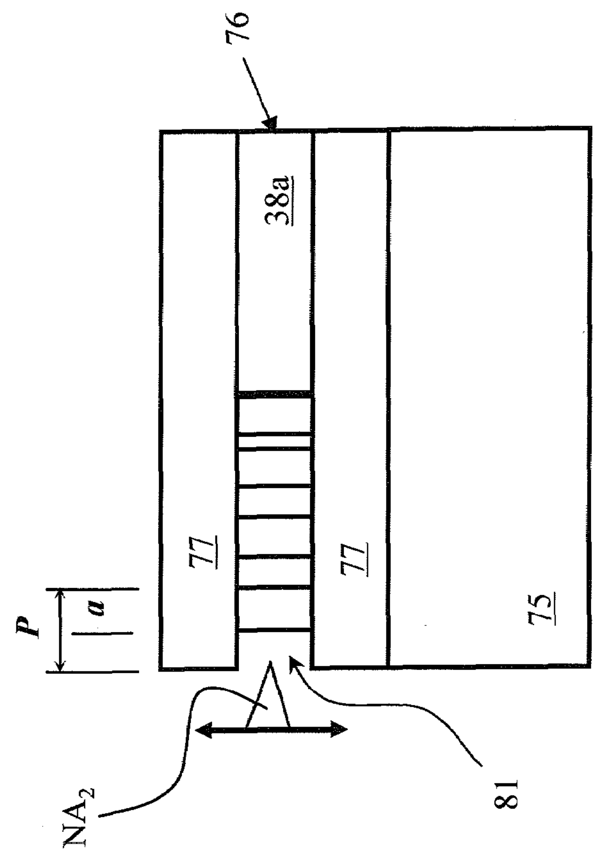
FIG. 13 is a side view of periodically segmented slab segments in slab waveguide regions of the PLC WSS of FIG. 8.

In a preferred embodiment of the present invention, a periodically segmented slab segments (PSS) 81 is disposed at the interface of the exit slab waveguide sections 38*a* and 38*b* and the output fibers 42*a* and 42*b*, i.e. the output ports 39*a* and 39*b*, to reduce and tailor the NA of the light exiting the PLC chip 22 in the non-dispersive direction, as show in FIGS. 12 and 13. The PSS 81 have a substantially uniform period, in which the duty cycle, which represents the ratio between the waveguide segment a and the period P, reduces from 1 (on the side of the array of channel waveguides 37*a* and 37*b*) to an exit ratio between 0 and 1 (0.1 to 0.9, preferably 0.25 to 0.75) proximate the output ports 39*a* and 39*b*. By selecting an exit ratio smaller than 1, the mode in the non-dispersive direction is effectively expanded, thereby reducing the numerical aperture, as shown in FIG. 13.

Figure 14:
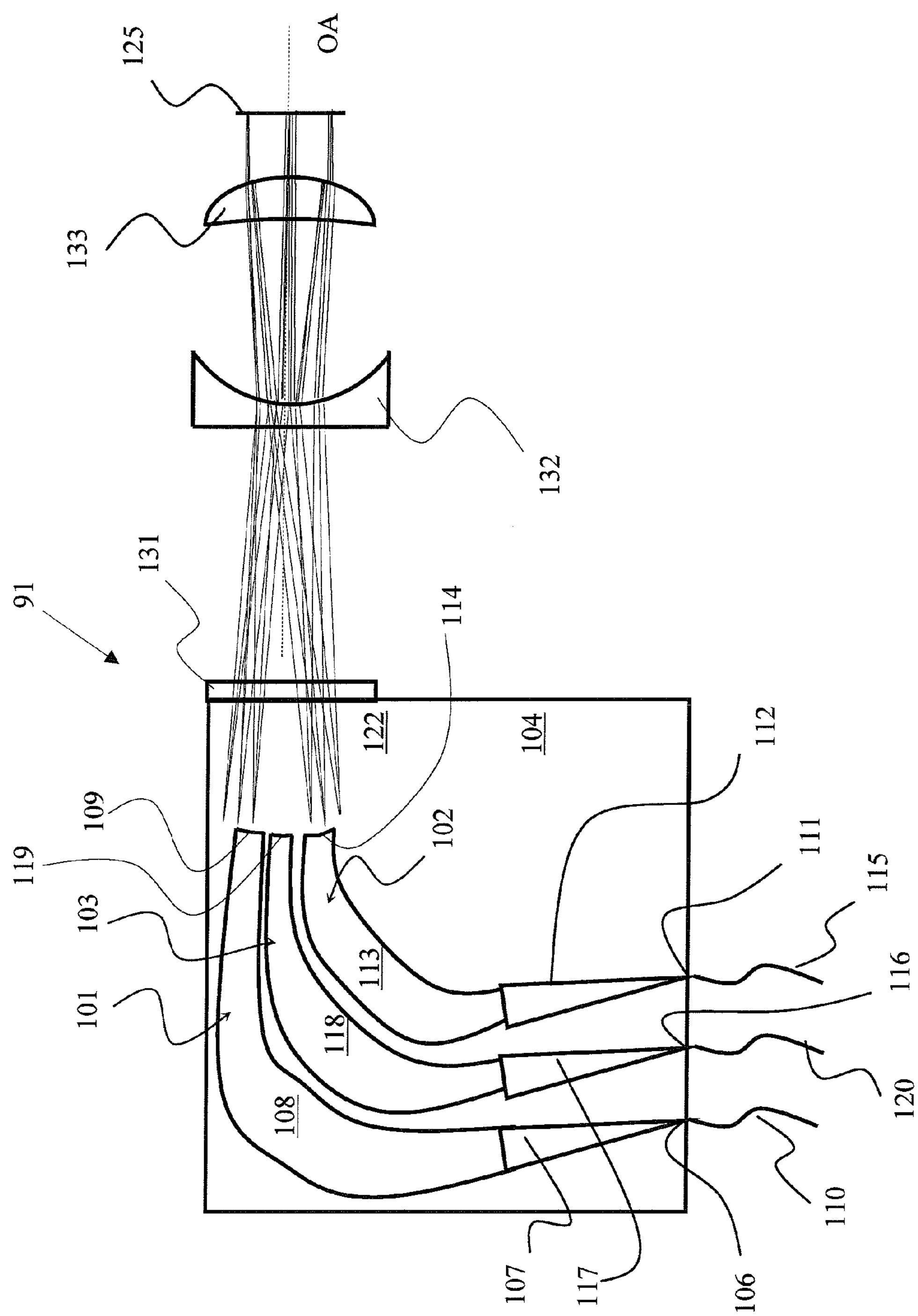
FIG. 14 is a plan view of another embodiment of a PLC WSS according to the present invention with light switched to the express port.
Figure 15:
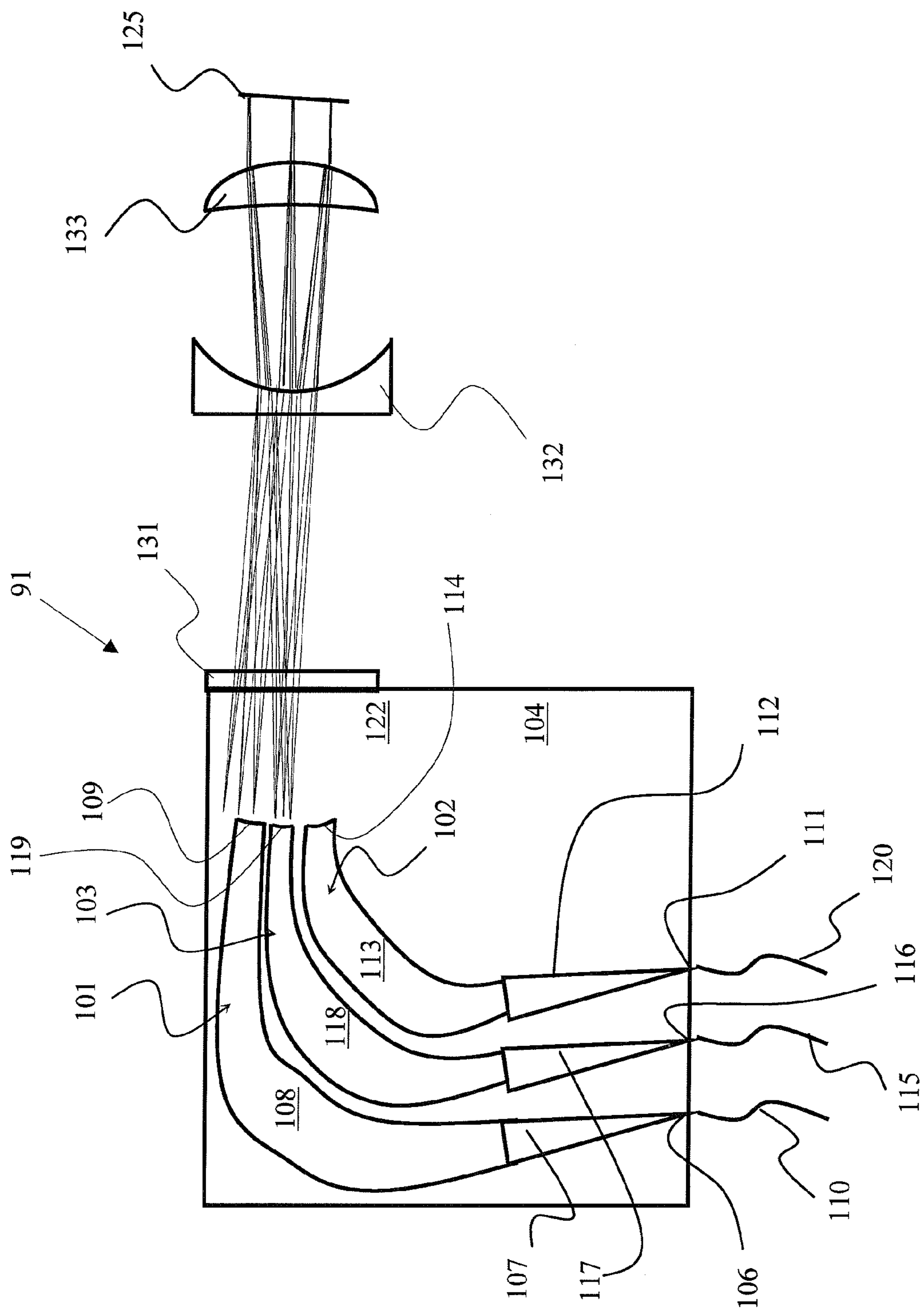
FIG. 15 is a plan view of the PLC WSS of FIG. 14 with light switched to the ADD/DROP port.

A specific embodiment of the present invention, illustrated in FIGS. 14 to 16, relates to an Add/Drop multiplexer 91 including an input or COMMON AWG 101, an output or EXPRESS AWG 102 and an input/output or ADD/DROP AWG 103 formed in a PLC chip 104. The functionality of the device is such that a contiguous band of DWDM channels, i.e. a continuous range of wavelengths, can be directed from the COMMON AWG 101 to the ADD/DROP AWG 102, with a desired center wavelength (CW) and bandwidth (BW). All wavelengths not corresponding to the desired range are routed with minimal attenuation to the EXPRESS AWG 103. Signals can either be added from the ADD/DROP AWG 103 to the COMMON AWG 101 or dropped from the COMMON AWG 101 to the ADD/DROP AWG 103. In the former case, signals corresponding to the EXPRESS configuration are input through the EXPRESS AWG 103 and output through the COMMON AWG 101. In the latter case, the express signals from the COMMON AWG 101 are output the EXPRESS AWG 103.

The COMMON AWG 101 includes an input port 106, an input slab waveguide 107, and an array of channel waveguides 108, having ends forming a curved interface, i.e. virtual pupil 109. The input port 106 is optically coupled to a waveguide 110, e.g. an optical fiber. The EXPRESS AWG 102 includes an output port 111, an output slab waveguide 112, an array of channel waveguides 113, having ends forming a curved interface, i.e. a virtual pupil 114. The output port 111 is optically coupled to a waveguide 115, e.g. an optical fiber, via coupling optics 121. The ADD/DROP AWG includes an input/output port 116, an input/output slab waveguide 117, and an array of channel waveguides 118, having ends forming a curved interface, i.e. a virtual pupil 119. The input/output port 116 is optically coupled to a waveguide 120, e.g. an optical fiber. The pupils 109, 114 and 119 are optically coupled to the edge of the PLC chip 104 with a slab waveguide region 122. Periodically segmented waveguide structures, as described above, can be added to the slab waveguides 107, 112, and 117 to improve the optical coupling loss and to reduce the numerical aperture in the non-dispersion direction.

FIG. 14 illustrates the ray trajectories for signals launched from the COMMON and EXPRESS AWGs 101 and 102, through the optical system and coming to foci in a focal or mirror plane 125. The optical system comprises a cylindrical lens 131, which acts in the direction normal to the PLC slab mode (the fast axis), and set of lenses 132 and 133, which acts in the direction parallel to the slab mode (the slow axis). Ideally, the fields for all wavelengths will result in waists located at the mirror plane 125, with wavelength channels spatially separated. As indicated in FIG. 14, the mirror 125 is perpendicular to the optical axes OA of the lenses 132 and 133. Furthermore, all rays coming from the COMMON AWG 101 above the normal of the mirror 125 are matched by rays coming from the EXPRESS AWG 102 at equal but opposite angles, i.e. the "telecentricity" condition, which holds for all wavelengths. Consequently, signals at all wavelengths launched from the COMMON AWG 101 will bounce from the mirror 125, which is at the mid-plane of the optical device, and exit through the EXPRESS AWG 102, and vice-versa.

If the mirror 125 is tilted an appropriate amount with respect to the optical axis OA, as illustrated in FIG. 15, the foci are still aligned at all wavelengths, but rather than exiting through the EXPRESS AWG 102, signals launched from the COMMON AWG 101 will be imaged to the ADD/DROP port 103, located between the COMMON and EXPRESS AWGs 101 and 102. Thus, all that distinguishes between the COMMON AWG 101 being optically coupled to the ADD/DROP AWG 103 or the EXPRESS AWG 102 is the tilt of the mirror 125 at the mid-plane.

To redirect a desired subset of wavelengths from the COMMON AWG 101 to the ADD/DROP AWG 103, a split mirror assembly (FIGS. 16*a* and 16*b*) including a redirecting element 136 is disposed in their path, while the remaining wavelengths bounce from the mirror 125 to the EXPRESS AWG 102. Ideally, the wavelengths connected between the COMMON and EXPRESS AWGs 101 and 102 are to be as low-loss as possible, whereas the wavelengths between COMMON and ADD/DROP AWGs 101 and 103 can afford to be somewhat lossier.

Figure 16B:
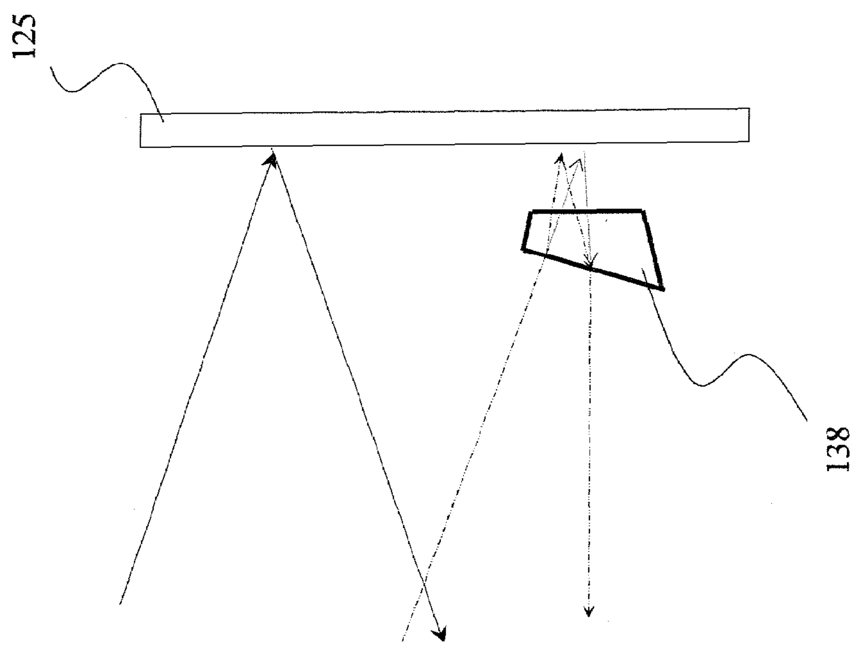
FIGS. 16*a* and 16*b* illustrate alternate embodiments of split mirror assemblies in accordance with FIG. 15.
Figure 16A:
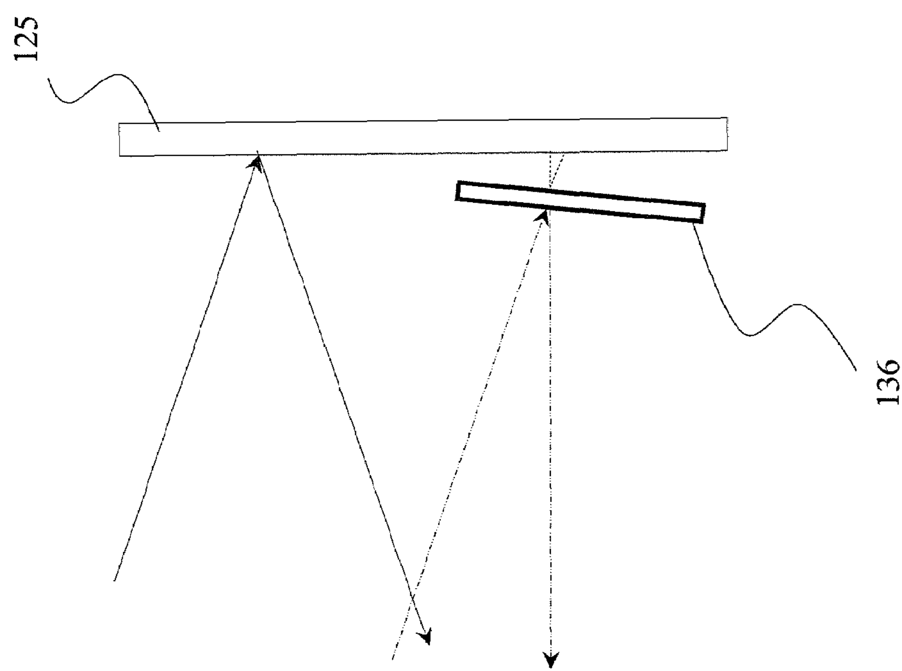

Exemplary embodiments of a split mirror assembly are illustrated in FIGS. 16*a* and 16*b*. The upper (solid) rays represent chief rays for a wavelength destined to be coupled between the COMMON and EXPRESS AWGs 101 and 102, whereas the lower (dashed) rays correspond to a wavelength destined to be coupled between the COMMON and ADD/DROP AWGs 101 and 103. In FIG. 16*a*, the upper rays bounce from the large, fixed mirror 125, whereas the lower rays are intercepted by a moveable mirror 136. If the moveable mirror 136 were shaped like a triangle, getting wider in one direction, e.g. into the page, then a desired CW can be selected by the vertical position of the moveable mirror 136 and a desired BW can be selected by choosing a position into/out of the page. As is consistent with the low-loss directive for the EXPRESS configuration, the upper (solid) ray bouncing from the fixed (larger) mirror 125 gets imaged accurately to the EXPRESS AWG 102. However, an examination of the virtual source positions of the lower (dashed) rays in FIG. 16*a*, i.e. suggested by the dotted lines, shows that the reflected ray is offset (and hence defocused) from its proper location, leading to some loss. Moving the small mirror 136 in one direction, e.g. up and down in the plane of the page, tunes the CW, while moving the small mirror 136 in a perpendicular direction, e.g. in and out of the plane of the page, tunes the BW. Thus, with a 2-D tuning mechanism, the desired functionality is achieved.

A further refinement in the basic moveable mirror idea is illustrated in FIG. 16*b*, in which a refractive prism 138 is used to effectively steer the beam from the COMMON AWG 101 toward the ADD/DROP AWG 103. The fixed mirror 125 is used in both configurations, but those wavelengths overlapping the prism 138 refract through the prism 138, reflect off of the fixed mirror 125, and refract back through the prism 138 toward the ADD/DROP AWG 103, whereas all others are directed toward the EXPRESS AWG 102. Not only is the coupling better (as evidenced by the virtual chief rays intercepting at the mirror), but the reflected angle is stable (to first order) to any rotations of the prism 138, making for a much more robust tuning mechanism.

Figures 17A, 17B, 17C:
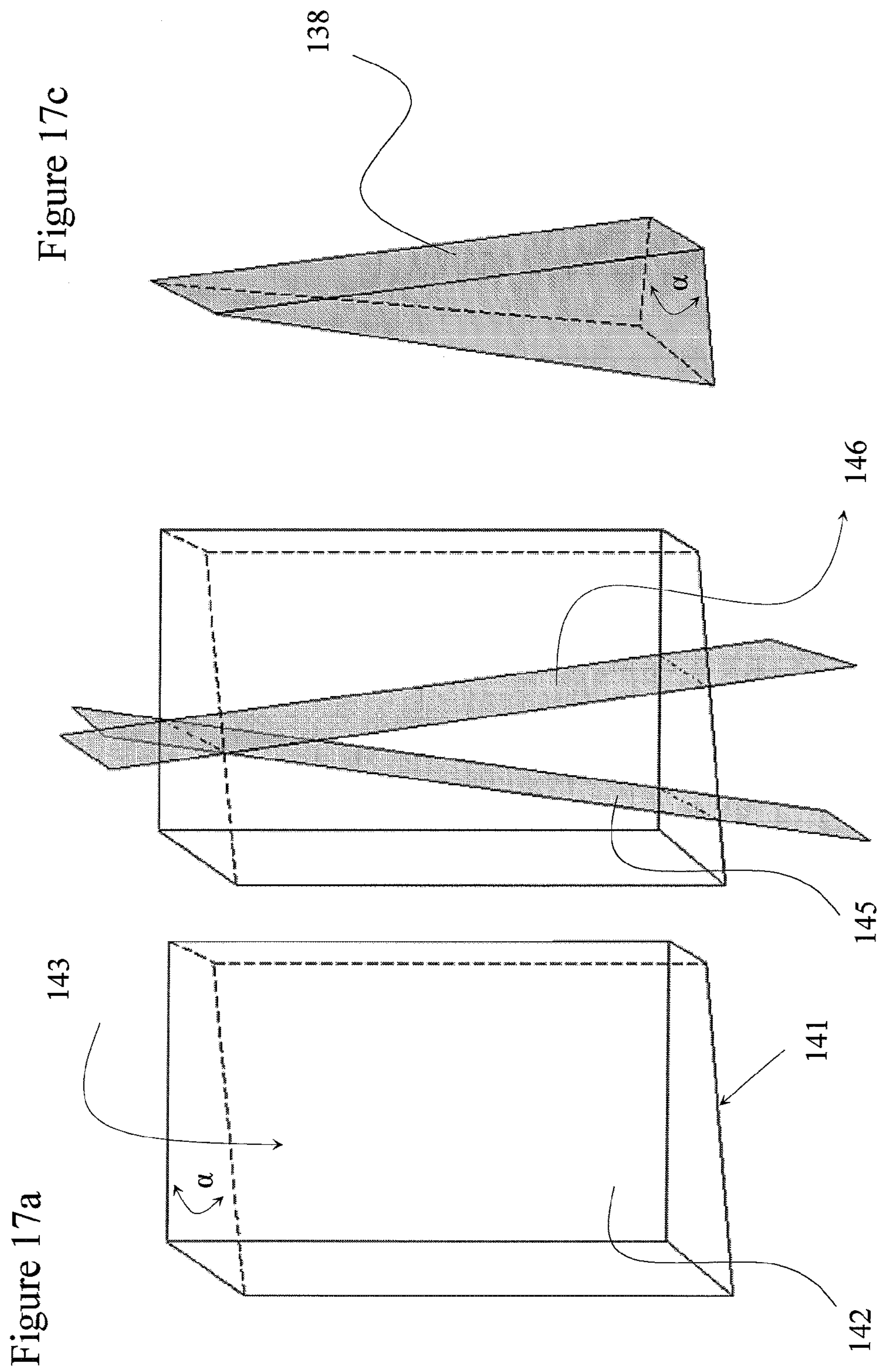
FIGS. 17*a* to 17*c* illustrate a switching wedge according to the PLC WSS of FIG. 14.

Manufacture of the reflective prism 138 is illustrated in FIGS. 17*a* to 17*c*. The element starts as a trapezoidal prism 141, as illustrated in FIG. 17*a*. The front and rear faces 142 and 143 are polished, with the acute angle $\alpha$ therebetween tightly controlled. All other surfaces are only finely-ground. The structure is then further ground along first and second side planes 145 and 146. The remaining asymmetric pyramid 138 (FIG. 17*c*) is the desired tuning optic. Again, moving the pyramid 138 in one direction, e.g. up and down in the plane of FIG. 16*b*, tunes the CW, while moving the pyramid 138 in a perpendicular direction, e.g. in and out of the plane of the page, tunes the BW. Thus, with a 2-D tuning mechanism, the desired functionality is achieved.

We claim:

1. A wavelength dispersive device comprising:

a first planar lightwave circuit (PLC) chip comprising:

an input port for launching an input optical signal including a plurality of wavelength channels;

an input arrayed waveguide grating (AWG) structure for dispersing the plurality of wavelength channels including: an input slab waveguide region optically coupled to the input port, a first array of channel waveguides, extending from the input slab waveguide region, and an input/output slab waveguide region for guiding the dispersed wavelength channels between the first array of channel waveguides and a first edge of the first PLC chip, wherein an interface between the first array of channel waveguides and the input/output slab waveguide region is curved providing optical power, which focuses the wavelength channels along a curved focal plane outside of the PLC chip;

a first plurality of output AWG structures for combining selected wavelength channels into output optical signals, each output AWG structure including: the input/output slab waveguide region for guiding the dispersed wavelength channels from the first edge of the first PLC chip; a second array of channel waveguides extending from the input/output slab waveguide region, and a first output slab waveguide region for guiding the output optical signals between the second array of channel waveguides to a second edge of the PLC chip, wherein an interface between the second array of channel waveguides and the input/output slab waveguide region is curved providing optical power; and a first plurality of output ports for outputting the output optical signals;

a first array of switching elements for independently redirecting each of the wavelength channels from the first input optical signal to selected first output arrayed waveguide grating structures forming the output optical signals for output respective first output ports; and a field lens between the first edge of the PLC chip and the first array of switching elements for changing the focal plane of the wavelength channels from the curved line to along a straight line defining the first array of switching elements.

2. The device according to claim 1, wherein spherical aberrations coming from the field lens are opposite in sign from the interface between the PLC chip and the free space.

3. The device according to claim 1, wherein the interface between the first array of channel waveguides and the input/output slab waveguide region is conical to improve optical coupling between input and output AWG structures.

4. The device according to claim 1, wherein all adjacent channel waveguides in the first array of channel waveguides have a constant delay therebetween.

5. The device according to claim 1, wherein refraction through the edge of the PLC chip creates a virtual pupil at a distance D/n from the first edge, where n is the effective slab index for the input/output slab waveguide region, and D is a distance from the first edge to the interface; and wherein the field lens is disposed, such that the virtual pupil appears in a front focal plane of the field lens.

6. The device according to claim 1, wherein the input slab waveguide region includes periodically segmented slab segments, which have a duty cycle of substantially one at one end, and a duty cycle between 0 and 1 at another end, which depends on a difference of index contrast between the PLC chip and a waveguide optically coupled to the input slab waveguide region.

7. The device according to claim 1, wherein each of the output slab waveguide regions includes periodically segmented slab segments, which have a duty cycle of substantially one at a first end, and a duty cycle between 0 and 1 at a second end, which depends on a difference of index contrast between the PLC chip and a waveguide optically coupled to the input slab waveguide region for reducing a numerical aperture of light exiting the output slab waveguide regions.

8. The device according to claim 7, wherein the duty cycle is between 0.1 to 0.9 at the second end.

9. The device according to claim 7, wherein the duty cycle is between 0.25 to 0.75 at the second end.

10. The device according to claim 1, wherein the first array of switching elements comprises a fixed mirror for reflecting a first optical signal to one of the first plurality of output AWG structures, and a moveable element for redirecting a second optical signal to another one of the first plurality of output AWGs.

11. The device according to claim 10, wherein the moveable element is reciprocatable in a first direction; and wherein the moveable element has a face with a variable width for tuning a passband of the second optical signal during reciprocation in the first direction.

12. The device according to claim 11, wherein the moveable element is reciprocatable in a second direction for tuning a center wavelength of the second optical signal.

13. The device according to claim 10, wherein the moveable element comprises a prism with non-parallel front and rear faces for redirecting the second optical signal.

14. The device according to claim 13, wherein the prism is an asymmetric pyramid for refracting wavelength channels off of the fixed mirror and back therethrough.

15. The device according to claim 14, wherein the asymmetric pyramid is reciprocatable in a first direction; and wherein the asymmetric pyramid has a face with a variable width for tuning a passband of the second optical signal during reciprocation in the first direction.

16. The device according to claim 15, wherein the moveable element is reciprocatable in a second direction for tuning a center wavelength of the second optical signal.

* * * * *

UNITED STATES PATENT AND TRADEMARK OFFICE

CERTIFICATE OF CORRECTION

PATENT NO. : 7,440,650 B2
APPLICATION NO. : 11/782419
DATED : October 21, 2008
INVENTOR(S) : Fondeur et al.

It is certified that error appears in the above-identified patent and that said Letters Patent is hereby corrected as shown below:

Col. 6, line 63, “30” should read -- 30' -- (first occurrence)

Signed and Sealed this

Fourth Day of August, 2009

JOHN DOLL

*Acting Director of the United States Patent and Trademark Office*